(12) United States Patent
Quimby et al.

(10) Patent No.: US 12,394,614 B2
(45) Date of Patent: Aug. 19, 2025

(54) ION SOURCE

(71) Applicant: AGILENT TECHNOLOGIES, INC., Santa Clara, CA (US)

(72) Inventors: Bruce D. Quimby, Santa Clara, CA (US); Anastasia A. Andrianova, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/747,343

(22) Filed: Jun. 18, 2024

(65) Prior Publication Data

US 2024/0339313 A1    Oct. 10, 2024

Related U.S. Application Data

(63) Continuation of application No. 16/830,577, filed on Mar. 26, 2020, now Pat. No. 12,033,843, and a continuation of application No. PCT/US2021/014634, filed on Jan. 22, 2021.

(51) Int. Cl.
   *H01J 49/06*    (2006.01)
   *G01N 30/72*    (2006.01)
   *H01J 49/14*    (2006.01)

(52) U.S. Cl.
   CPC ........ *H01J 49/067* (2013.01); *G01N 30/7206* (2013.01); *H01J 49/145* (2013.01); *H01J 49/147* (2013.01)

(58) Field of Classification Search
   CPC ........ H01J 49/067; H01J 49/10; H01J 49/145; H01J 49/147; G01N 30/7206; G01N 30/72
   See application file for complete search history.

(56) References Cited

U.S. PATENT DOCUMENTS

| | | | |
|---|---|---|---|
| 5,086,256 A | 2/1992 | Tokiguchi et al. | |
| 5,092,219 A * | 3/1992 | Rounbehler | G01N 30/08 95/82 |
| 5,633,497 A | 5/1997 | Brittain et al. | |
| 6,407,382 B1 * | 6/2002 | Spangler | G01N 27/623 250/288 |

(Continued)

FOREIGN PATENT DOCUMENTS

| | | |
|---|---|---|
| CN | 102163531 A | 8/2011 |
| CN | 105340049 A | 2/2016 |

(Continued)

OTHER PUBLICATIONS

Agilent Technologies, Inc., "UltiMetal Plus—Advanced CHEmitry for Stainless Steel Surface Deactivation", Mar. 25, 2014, 6 pages.

(Continued)

*Primary Examiner* — David A Vanore
(74) *Attorney, Agent, or Firm* — Lando & Anastasi, LLP

(57) ABSTRACT

Provided herein is an ion source containing a plurality of components, at least one of which is partially coated with a layer of silicon. The ion source reduces reactivity between the sample and the carrier gas, reduces or eliminates tailing in ion chromatograms, and/or improves mass spectral fidelity. Also provided are methods of using the ion source in a mass spectrometer or gas chromatograph-mass spectrometer.

17 Claims, 9 Drawing Sheets

(56) References Cited

U.S. PATENT DOCUMENTS

| | | | |
|---|---|---|---|
| 6,878,932 B1* | 4/2005 | Kroska | H01J 49/10 250/288 |
| 7,335,896 B2* | 2/2008 | Pilz | H01J 49/10 313/163 |
| 7,928,370 B2 | 4/2011 | Amirav et al. | |
| 8,378,293 B1 | 2/2013 | Quimby et al. | |
| 9,208,983 B2* | 12/2015 | Sato | H01J 27/08 |
| 9,384,937 B2* | 7/2016 | Mason | H01J 37/3171 |
| 9,502,226 B2 | 11/2016 | Brown et al. | |
| 9,543,110 B2* | 1/2017 | Colvin | H01J 37/08 |
| 9,696,285 B2 | 7/2017 | Duraffourg et al. | |
| 10,012,623 B2* | 7/2018 | Cisterni | G01N 30/14 |
| 10,365,256 B2* | 7/2019 | Guzzonato | H01J 49/0468 |
| 10,573,486 B2* | 2/2020 | Hwang | H01J 37/147 |
| 10,622,200 B2* | 4/2020 | Kornilova | H01J 49/145 |
| 11,120,966 B2* | 9/2021 | Chang | H01J 37/3171 |
| 11,232,925 B2* | 1/2022 | Chang | H01J 27/205 |
| 11,495,447 B2* | 11/2022 | Nishiguchi | H01J 49/401 |
| 12,033,843 B2* | 7/2024 | Quimby | G01N 30/7206 |
| 2002/0026821 A1 | 3/2002 | Zimmermann et al. | |
| 2002/0063205 A1* | 5/2002 | Green | H01J 49/40 250/281 |
| 2002/0063206 A1* | 5/2002 | Bateman | H01J 49/0045 250/281 |
| 2002/0070339 A1* | 6/2002 | Clemmer | H01J 49/004 250/299 |
| 2002/0162959 A1* | 11/2002 | Itoi | H01J 49/067 250/292 |
| 2003/0052266 A1* | 3/2003 | Shimomura | H01J 49/147 250/281 |
| 2004/0041091 A1* | 3/2004 | Bateman | H01J 49/34 250/281 |
| 2006/0022143 A1* | 2/2006 | Pilz | H01J 49/10 250/423 R |
| 2008/0001082 A1* | 1/2008 | Syms | H01J 49/067 250/288 |
| 2008/0128608 A1* | 6/2008 | Northen | H01J 49/0413 428/156 |
| 2011/0272593 A1* | 11/2011 | Graf | H01J 37/3002 250/423 R |
| 2012/0286152 A1* | 11/2012 | Jones | H01J 49/10 427/523 |
| 2013/0099113 A1 | 4/2013 | Quimby et al. | |
| 2014/0062286 A1* | 3/2014 | Sato | H01J 5/10 313/231.41 |
| 2014/0110661 A1* | 4/2014 | Wang | H10N 99/00 438/20 |
| 2014/0326594 A1* | 11/2014 | Biloiu | C23F 4/00 315/111.21 |
| 2015/0179393 A1 | 6/2015 | Colvin et al. | |
| 2017/0184552 A1 | 6/2017 | Guzzonato et al. | |
| 2020/0234939 A1* | 7/2020 | Cheung | H01J 49/061 |

FOREIGN PATENT DOCUMENTS

| | | |
|---|---|---|
| CN | 107078020 A | 8/2017 |
| EP | 1920243 B1 | 9/2015 |
| EP | 3534392 A1 | 9/2019 |
| IT | 201700100732 A1 | 3/2019 |
| JP | H09-229903 A | 9/1997 |
| JP | 2003-092079 A | 3/2003 |
| JP | 2013-061324 A | 4/2013 |
| JP | 2016-522964 A | 8/2016 |
| WO | 2006060130 A2 | 6/2006 |
| WO | 2007127631 A2 | 11/2007 |
| WO | 2016083964 A1 | 6/2016 |

OTHER PUBLICATIONS

Agilent Technologies, Inc., "UltiMetal Plus Stainless Steel Deactivation for Tubing, Connectors, and Fittings", May 6, 2014, 18 pages.

International Search Report and Written Opinion for Application PCT/US2021/014634 filed date Jan. 22, 2021, mailed date May 17, 2021, 7 pages.

Regmi et al.: Micro Gas Chromatography: An Overview of Critical Components and Their Integration; Anal. Chem. Oct. 25, 2018; 90; pp. 13133-13150; United States.

Office Action—Japan Patent Office—Japanese Application No. 2022-552636—mailed Oct. 22, 2024.

Chinese Office Action and Search Report—China Patent Office—China Application No. 202180024035.7—mailed Dec. 11, 2024.

* cited by examiner

ION SOURCE

PRIORITY

This application is a Continuation of commonly assigned and co-pending U.S. patent application Ser. No. 16/830,577, filed Mar. 26, 2020, and further claims the benefit of priority to PCT Application Serial No. PCT/US21/14634, filed Jan. 22, 2021, the disclosures of which are incorporated by reference in their entireties.

BACKGROUND

Distortion of chromatographic peaks and mass spectra generated with a gas chromatograph/mass spectrometer can occur when hydrogen is present as either the carrier gas or as a cleaning agent added to the source when helium is the carrier gas.

Unwanted interactions of analyte molecules and ions with hydrogen and materials in the ionization source of the mass spectrometer result in problems such as changes in the mass spectrum and the distortion (tailing) of chromatographic peaks. These problems are particularly serious with analytes that have functional groups or chemical bonds that can be reduced in the presence of hydrogen. In some cases, the principal ions of the analyte exhibit non-tailing peaks, but the total ion chromatogram (TIC) will have a substantial tail resulting from degradation products formed from hydrogen reacting with the compound.

The problem of distortion of the mass spectrum can be a serious one. For some compounds, the spectrum can be so changed from reference library spectra (e.g., National Institute of Standards and Technology (NIST) Mass Spectral Database) used for identification that the analyte is incorrectly identified as a different compound.

Accordingly, there is still an unmet need for ion sources that show spectral fidelity when used with hydrogen gas. This disclosure provides a solution to this need.

BRIEF SUMMARY OF THE INVENTION

In one aspect, an ion source is provided and includes a sample entrance and a plurality of components having a surface and making an ion flow path, wherein the surface of at least one of the plurality of components making the ion flow path is at least partially coated with a layer of silicon (Si), silicon hydride (SiH), or a combination thereof.

In another aspect, a method of analyzing a sample with a mass spectrometer includes using the ion source described herein. The method includes flowing the sample in a carrier gas through the sample entrance, ionizing the sample by at least one of the plurality of components making the ion flow path to provide ions, and analyzing the ions based on ion mass.

In a further aspect, an ion source is provided and includes a source chamber, a drawout cylinder, a drawout plate, an entrance lens, an ion focus lens, a repeller, a repeller block insert, an extractor lens, at least one post extractor lens, or a combination thereof, wherein at least one of the source chamber, the drawout cylinder, the drawout plate, the entrance lens, the ion focus lens, the repeller, the repeller block insert, the extractor lens, or the at least one post extractor lens is at least partially coated with a layer of silicon.

In yet another aspect, distortion of mass spectra or chromatographic peaks when using a gas chromatograph/mass spectrometer with hydrogen as either the carrier gas or as a cleaning agent added to the source when helium is the carrier gas is a persistent problem. Advantageously, in some examples, the ion source described herein improves performance for compounds such as nitrobenzene and 3-nitroaniline that are susceptible to hydrogenation, resulting in higher spectral match values and more accurate identifications when searched against reference spectral libraries. For some compounds like nitrobenzene, the EICs for the principal ions exhibit different degrees of tailing, making integration and identification via qualifier ratios challenging. Advantageously, in some examples, the ion source described herein reduces or eliminates tailing in total ion chromatograms (TICs) and extracted ion chromatograms (EICs).

Additional features and advantages of various examples will be set forth, in part, in the description that follows, and will, in part, be apparent from the description, or may be learned by the practice of various examples. The objectives and other advantages of various examples will be realized and attained by means of the elements and combinations particularly pointed out in the description herein.

BRIEF DESCRIPTION OF THE FIGURES

The drawings illustrate generally, by way of example, but not by way of limitation, various examples of the present application.

FIG. 5A shows the reference library spectrum for nitrobenzene from NIST 17. FIG. 5B shows the mass spectrum of nitrobenzene with hydrogen carrier gas using a 3 mm drawout plate. FIG. 5C shows the reaction for hydrogenation of nitrobenzene. FIG. 5D shows the extracted ion chromatograms (EICs) for ions 77, 93, and 123. The 93 EIC has a severe tail, according to some examples;

FIG. 7A shows a chromatogram of an n-$C_{10}$ to n-$C_{40}$ sample run with Prior Attempts 1 and 2, as well as the inventive ion source. The signals are the response at mass 57 normalized to the height of the n-$C_{13}$ peak to aid in comparison. FIG. 7B shows an expanded view of the n-$C_{28}$ to n-$C_{31}$ alkanes, according to some examples;

The same part numbers designate the same or similar parts throughout the figures.

DETAILED DESCRIPTION OF THE INVENTION

Figure 1:
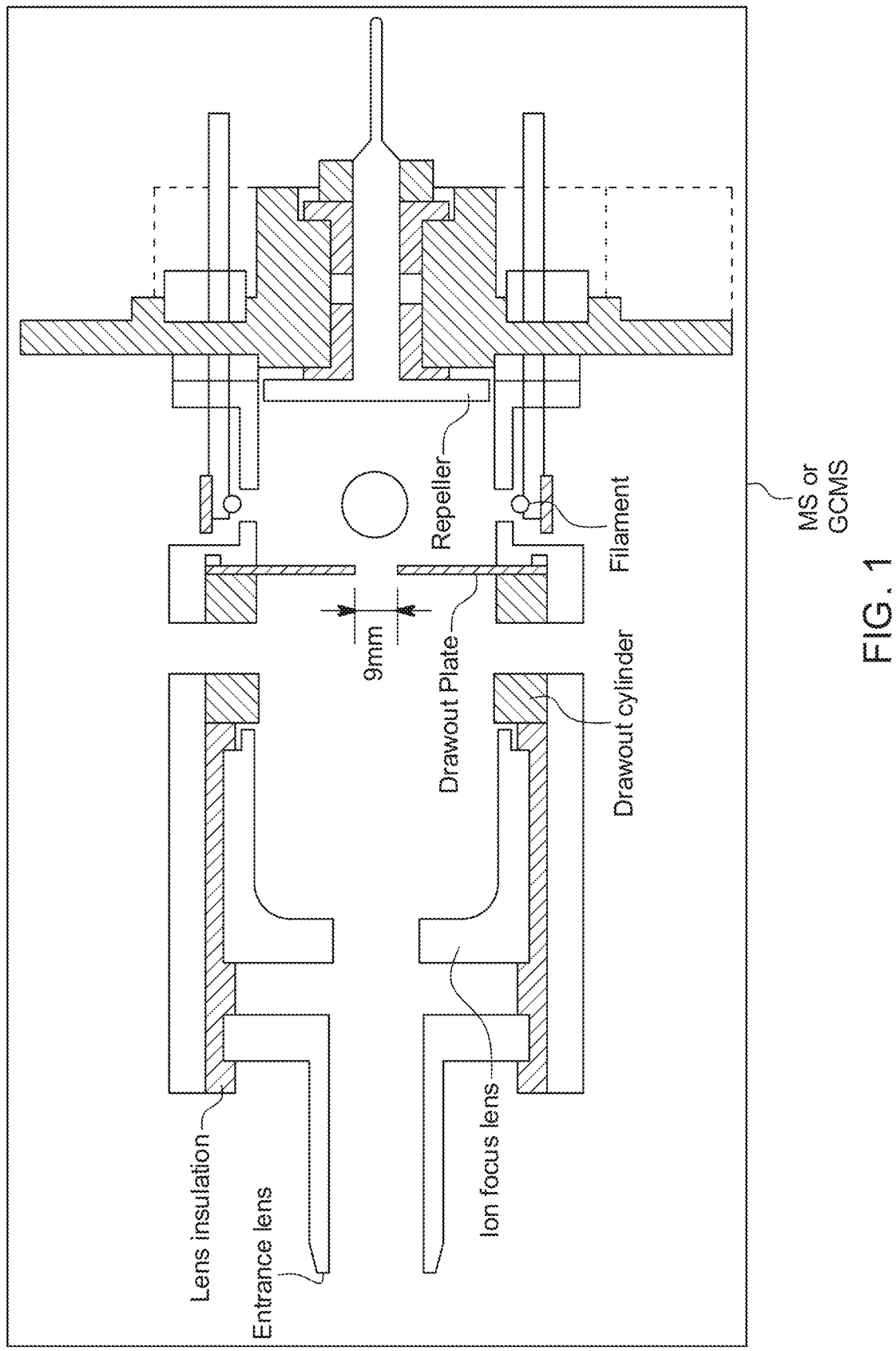
FIG. 1 shows a cross-section of an ion source with a 9 mm aperture in the drawout plate, according to some examples.

Reference will now be made in detail to certain examples of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "inner surface" as used herein refers to any surface within a chamber, such as an ionization chamber, other enclosure, or a component that can be subject to an undesirable interaction with the analyte. The term encompasses surfaces of a component that may not be a part of the chamber but that is disposed within the chamber, such as means for sample introduction, repellers, extractor lenses, drawout plates, and the like, and that can be subject to undesirable interactions with the analytes.

The term "outer surface" as used herein refers to a portion of the surface of a component that is at least partially exposed to the atmosphere or environment when the ion source described herein is operating. The outer surface can be coated with silicon, but this coating on the outer surface does not contribute to the improvements in spectral fidelity described herein.

The term "ionization chamber" is used herein to refer to a solid structure that substantially encloses a volume in which the sample, typically a gas, is ionized. The solid structure may also constitute part of a mass analyzer; for example, an ion trap wherein electron impact or chemical ionization occurs inside the trap.

As used herein, the terms "silicon hydride" or "SiH" refer to decomposition products of $SiH_4$ after it is thermally decomposed on a surface. In some examples, the decomposition of $SiH_4$ on a surface can result in the formation of a silicon (Si) layer with concomitant loss of $H_2$. In some examples, the loss of $H_2$ can be incomplete, and in these cases a portion of the silicon can contain Si—H functionality. The Si—H functionality can be present on the surface of a silicon layer and/or in the interior of a silicon layer.

Ion Source with Silicon Layer Coating

In one example, an ion source is provided. The ion source can be an electron ionization (EI) ion source or a chemical ionization (CI) ion source. The ion source includes a sample entrance and a plurality of components having a surface and making an ion flow path, wherein the surface of at least one of the plurality of components making the ion flow path is at least partially coated with a layer of silicon (Si), silicon hydride (SiH), or a combination thereof. When the ion source is part of a device, such as a mass spectrometer, in some examples, only one or more of the plurality of components between the sample entrance and the ion flow outlet are coated with silicon. For example, components downstream of the ion flow outlet, such as the mass analyzer, do not have the silicon coating described herein. In one example, the surface is an inner surface, and the inner surface of a plurality of components is at least partially coated with a layer of silicon (Si), silicon hydride (SiH), or a combination thereof. The outer surface of a plurality of components can also be at least partially coated with a layer of silicon (Si), silicon hydride (SiH), or a combination thereof in some examples.

When the surface of at least one of the plurality of components making the ion flow is at least partially coated with a layer of silicon, the portion of the surface of any given component coated with silicon can be at least about or equal to about 50% or less, 55%, 60%, 65%, 70%, 75%, 85%, 90%, 95%, 98%, 99%, 99.5%, or 99.9% of the surface area. The portion of the surface of any given component that is coated with silicon can be identical between all coated components or can be different for each particular component. In some examples, the surface of at least one of the plurality of components is conformally coated with silicon.

Figure 2:
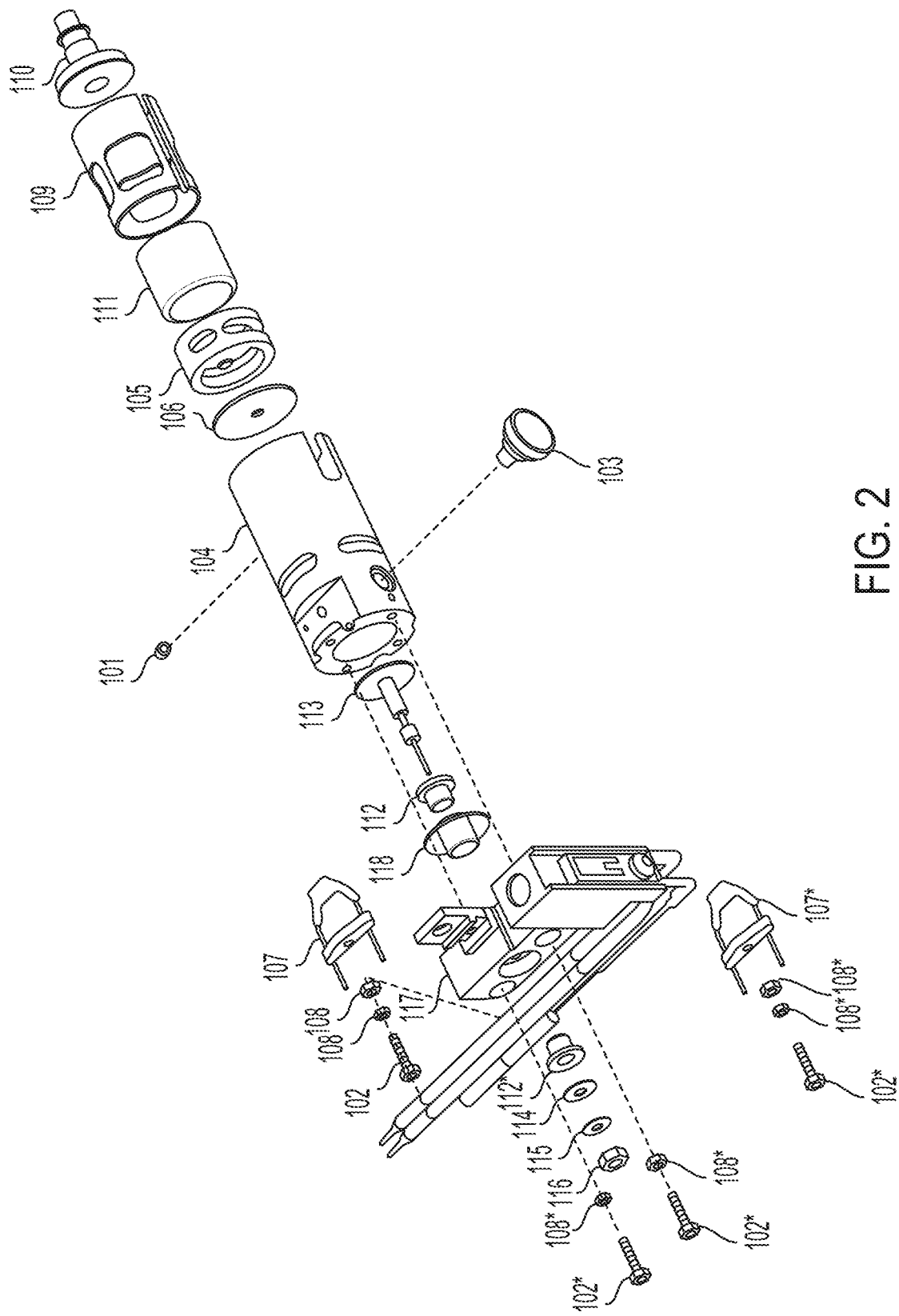
FIG. 2 shows an exploded view of an ion source, according to some examples.

FIG. 2 shows an exploded view of various components of an electron ionization stainless steel ion source. Referring to FIG. 2, the components of an ion source can include a gold plated set screw (101), gold plated screw (102), interface socket (103), ionization chamber (104), drawout cylinder (105), drawout plate (106), four-turn filament (107), spring washer (108), lens insulator (109), entrance lens (110), ion focus lens (111), repeller insulator (112), repeller (113), flat washer (114), Belleville spring washer (115), repeller nut (116), source heater block assembly (117), and repeller block insert (118). In some examples, the plurality of components includes at least one of an ionization chamber (104), a drawout cylinder (105), a drawout plate (106), an entrance lens (110), an ion focus lens (111), a repeller (113), or a repeller block insert (118). In another example, the plurality of components includes one of the ionization chamber (104), the drawout cylinder (105), or the repeller (113). In one example, the sample entrance can be through the center of the interface socket (103) into the ionization chamber (104).

Figure 3:
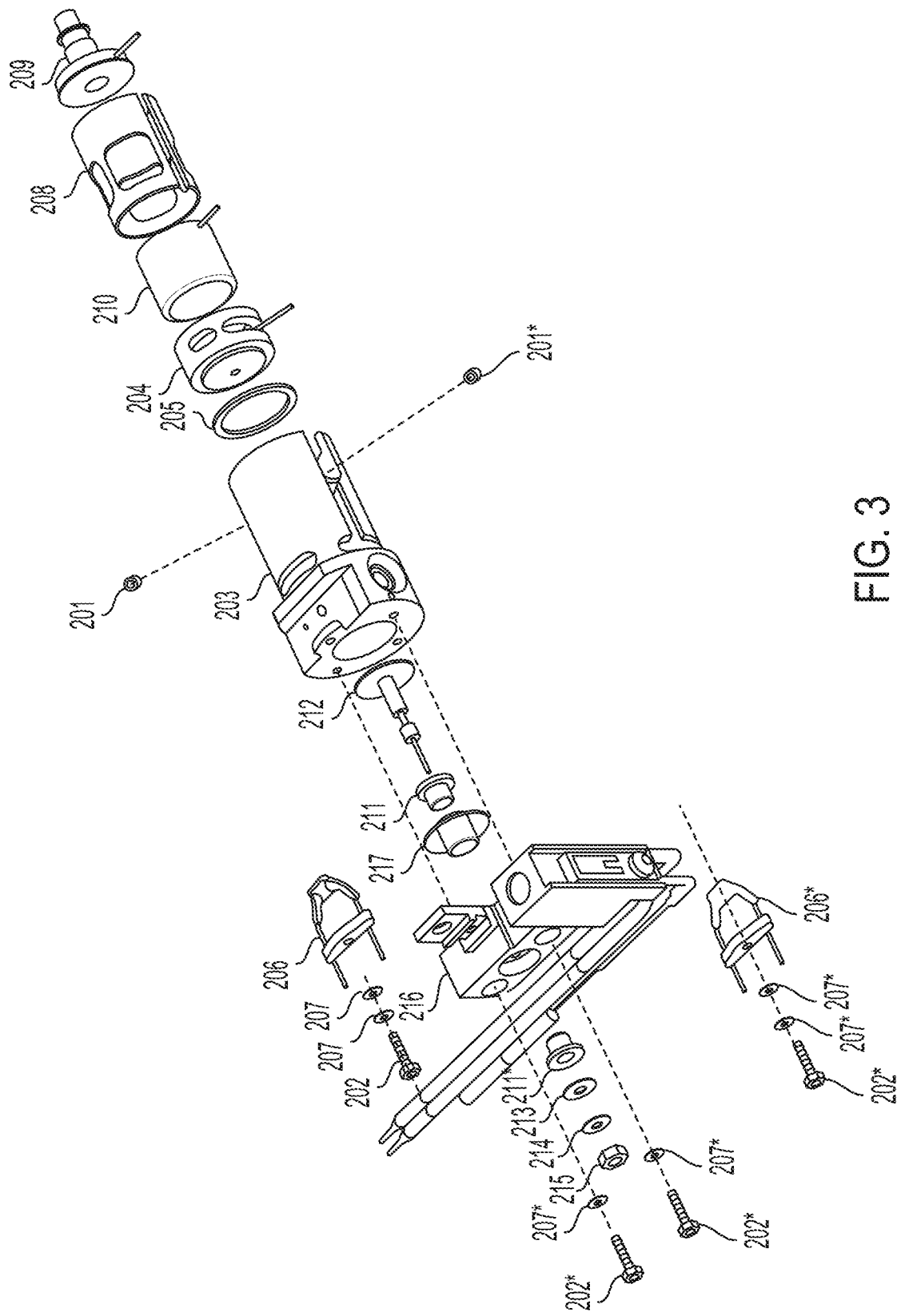
FIG. 3 shows an exploded view of an ion source, according to some examples.

FIG. 3 shows an exploded view of various components of an electron ionization ion source. Referring to FIG. 3, the components of an ion source can include set screws (201), screws (202), ionization chamber (203), extractor lens (204), extractor lens insulator (205), filaments (206), spring washer (207), flat washer (207), lens insulator (208), extended entrance lens assembly (209), ion focus lens (210), repeller insulator (211), repeller (212), flat washer (213), Belleville spring washer (214), repeller nut (215), source heater block assembly (216), and repeller block insert (217). In some examples, the plurality of components includes at least one of source body (203), extractor lens (204), extended entrance lens assembly (209), ion focus lens (210), repeller (212), repeller block insert (217). In one example, the plurality of components includes one of the source body (203), extractor lens (204), or the repeller (212). In one example, the ion source in FIG. 3 can be configured to set the voltage of the ionization chamber separately from the extractor lens (204) and from the repeller (212). The ion source in FIG. 3, in some examples, can have a signal response that is about 2- to about 4-fold greater compared to the ion source in FIG. 2.

Figure 4:
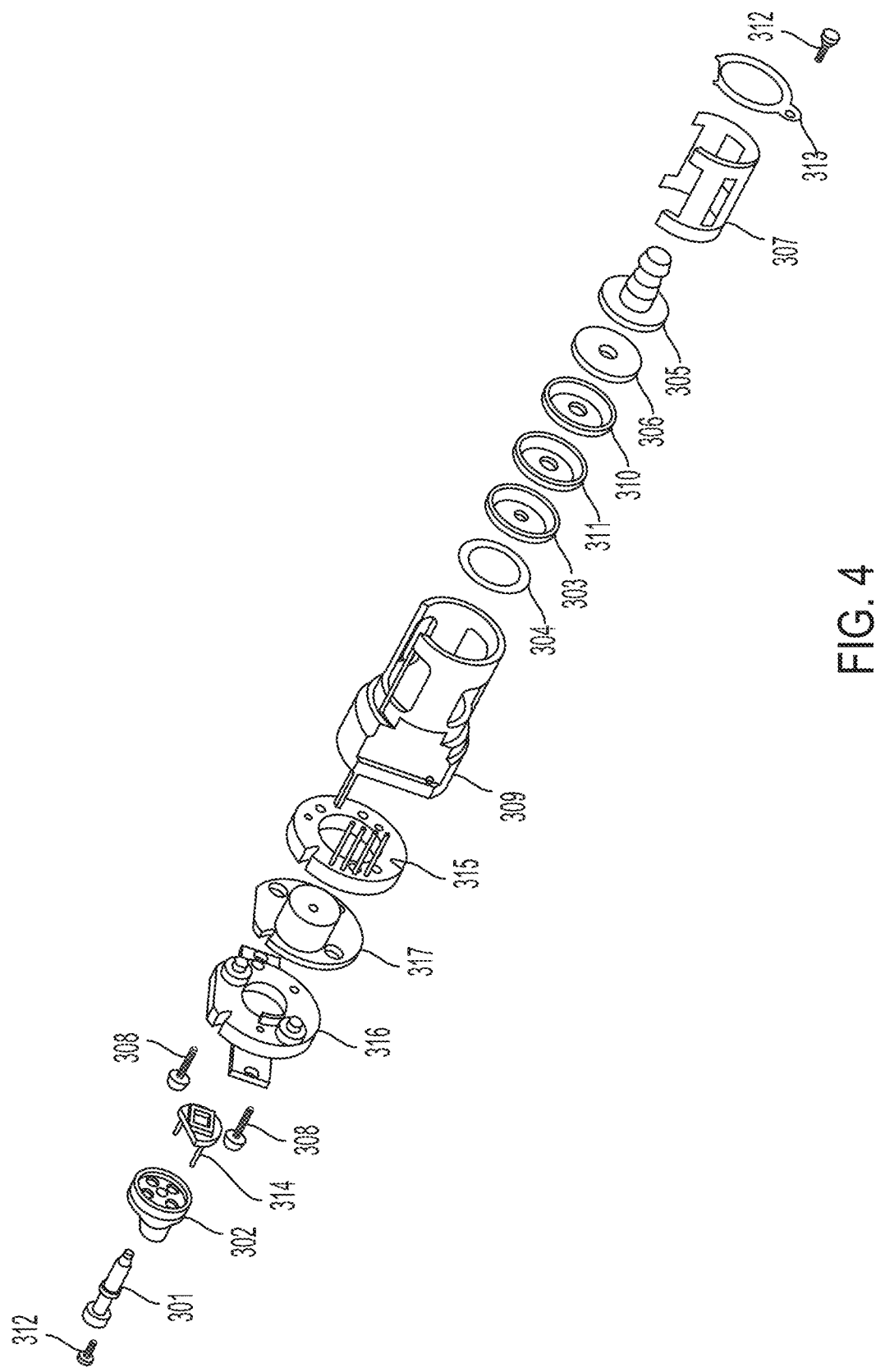
FIG. 4 shows an exploded view of an ion source, according to some examples.

FIG. 4 shows an exploded view of various components of an election ionization ion source. Referring to FIG. 4, the components of an ion source can include a source finger grip (301), filament block (302), extractor lens (303), ceramic insulator for extractor (304), extended entrance lens assembly (305), ion focus lens (306), lens insulator/holder (307), gold plated screw (308), source body (309), post-extractor lens 2 (310), post-extractor lens 1 (311), gold plated screw (312), locking ring lens insulator (313), high-efficiency dual filament (314), ring heater/sensor assembly (315), source mount (316), and repeller assembly (317). In another example, the plurality of components includes one of the source body (309), post-extractor lens 2 (310), post-extractor lens 1 (311), or the repeller assembly (317). In one example, the ion source in FIG. 4 can be configured to set the voltage of the ionization chamber separately from the extractor lens (303), post-extractor lens 2 (310), post-extractor lens 1 (311), and from the repeller assembly (317). The ion source in FIG. 4, in some examples, can have a signal response that is about 10- to about 20-fold greater compared to the ion source in FIG. 2.

The plurality of components can include one, two, three, four, five, or six partially coated components, such as the partially silicon-coated components, as described herein.

In various examples, the silicon layer can be from about 50 to about 1200 Å (Angstroms) thick. The silicon layer can be, in some examples, from about 100 to about 1100, from about 200 to about 1000, from about 300 to about 1000, from about 400 to about 1000, from about 500 to about 1000, or from about 600 to about 1000 Å thick. The silicon layer can be about 50, 100, 200, 300, 400, 500, 600, 700, 800, 900, 1000, 1100, or about 1200 Å thick. The components described herein as coated with a silicon layer can have silicon layers with substantially the same or similar thickness, or each component coated with a silicon layer can have a silicon layer with a different thickness from other components. The silicon layer can be deposited onto the component using known techniques, including CVD (chemical vapor deposition), ALD (atomic layer deposition), PVD (physical vapor deposition), sputtering, evaporation, plating techniques, and the like.

In various examples, the silicon layer can be at least 97%, 98%, 99%, 99.5%, 99.9%, or 99.99% pure silicon. The silicon layer can contain, in some examples, from about 0.001% to about 3% silicon hydride. In some examples, the silicon layer can contain less than about 3%, 2%, 1%, 0.5%, 0.25%, 0.1%, 0.05%, or 0.001% silicon hydride.

In one example, an ion source can include a source chamber, a drawout cylinder (105), a drawout plate (106), an entrance lens (110), an ion focus lens (111), a repeller (113), a repeller block insert (118), an extractor lens, an entrance lens (110), an ion focus lens (111), at least one post-extractor lens, or a combination thereof, wherein at least one of the source chamber, the drawout cylinder, the drawout plate, the entrance lens, the ion focus lens, the repeller, the repeller block insert, the extractor lens, the entrance lens, the ion focus lens, or the at least one post-extractor lens is at least partially coated with a layer of silicon. In another example, the ion source is one of an electron ionization high-efficiency source, an electron ionization inert extractor source, or an electron ionization stainless steel source.

Although the present disclosure describes specific parts that can be suitable for coating with the silicon layer described herein, the benefits and advantages of the silicon coating can be obtained if other parts of a mass spectrometer not specifically mentioned herein are coated. For example, any part in an ion source that comes into contact with ions in a high-temperature environment and in the presence of a reactive gas such as hydrogen can lead to providing the benefits and advantages described herein if this part is coated with silicon rather than uncoated. These parts can include those found in other types of instruments, such ion traps, single quadrupole mass spectrometers, triple quadrupole mass spectrometers, quadrupole time-of-flight mass spectrometers, and the like.

Methods of Analyzing Samples

In one example, a mass spectrometer containing the ion source described herein is provided. In other examples, a gas chromatograph-mass spectrometer containing the ion source described herein is provided.

In one example, a method of analyzing a sample with a mass spectrometer that includes the ion source described herein is provided. The method includes flowing the sample in a carrier gas through the sample entrance, ionizing the sample by at least one of the plurality of components making the ion flow path to provide ions, and analyzing the ions based on ion mass. The ionizing can be by electron ionization or chemical ionization. In some examples, the method further includes a gas chromatograph that can operate with the mass spectrometer.

The sample can be any suitable sample that can enter the gas phase for mass spectrometric analysis. The sample can include one or more groups known to be susceptible to hydrogenation by hydrogen under the conditions found in a mass spectrometer, such as nitro groups, carbon-carbon double bonds, carbonyl groups, and the like.

In some examples, the carrier gas includes at least one of hydrogen ($H_2$) or helium (He). In other examples, the carrier gas is a mixture of hydrogen and an inert gas such as helium, nitrogen, or argon. The relative proportion of hydrogen to inert gas is not particularly limited, and can include 99:1, 95:5, 90:10, 80:20, 70:30, 60:40, 50:50, 40:60, 30:70, 20:80, 10:90, 5:95, or 1:99 hydrogen:inert gas ratios. The method can further include flowing a conditioning gas into the mass spectrometer, wherein the conditioning gas is different from the carrier gas. As used herein, the term "conditioning gas" generally refers to a gas capable cleaning or otherwise bringing an ion source and/or other components or regions of a mass spectrometer to a condition that improves or optimizes the performance of the mass spectrometer. The conditioning gas can be used according to the methods described in U.S. Pat. No. 8,378,293, which is herein incorporated by reference in its entirety. In some examples, the conditioning gas includes hydrogen. In other examples, the carrier gas includes at least one of helium, nitrogen, or argon.

In various examples, the method reduces reactivity between the sample and the carrier gas, reduces or eliminates tailing in ion chromatograms, or improves mass spectral fidelity.

EXAMPLES

Various examples of the present application can be better understood by reference to the following Examples which are offered by way of illustration. The scope of the present application is not limited to the Examples given herein.

Comparative Example 1: Spectral Fidelity of Nitrobenzene

Figures 5A, 5B, 5C, 5D:
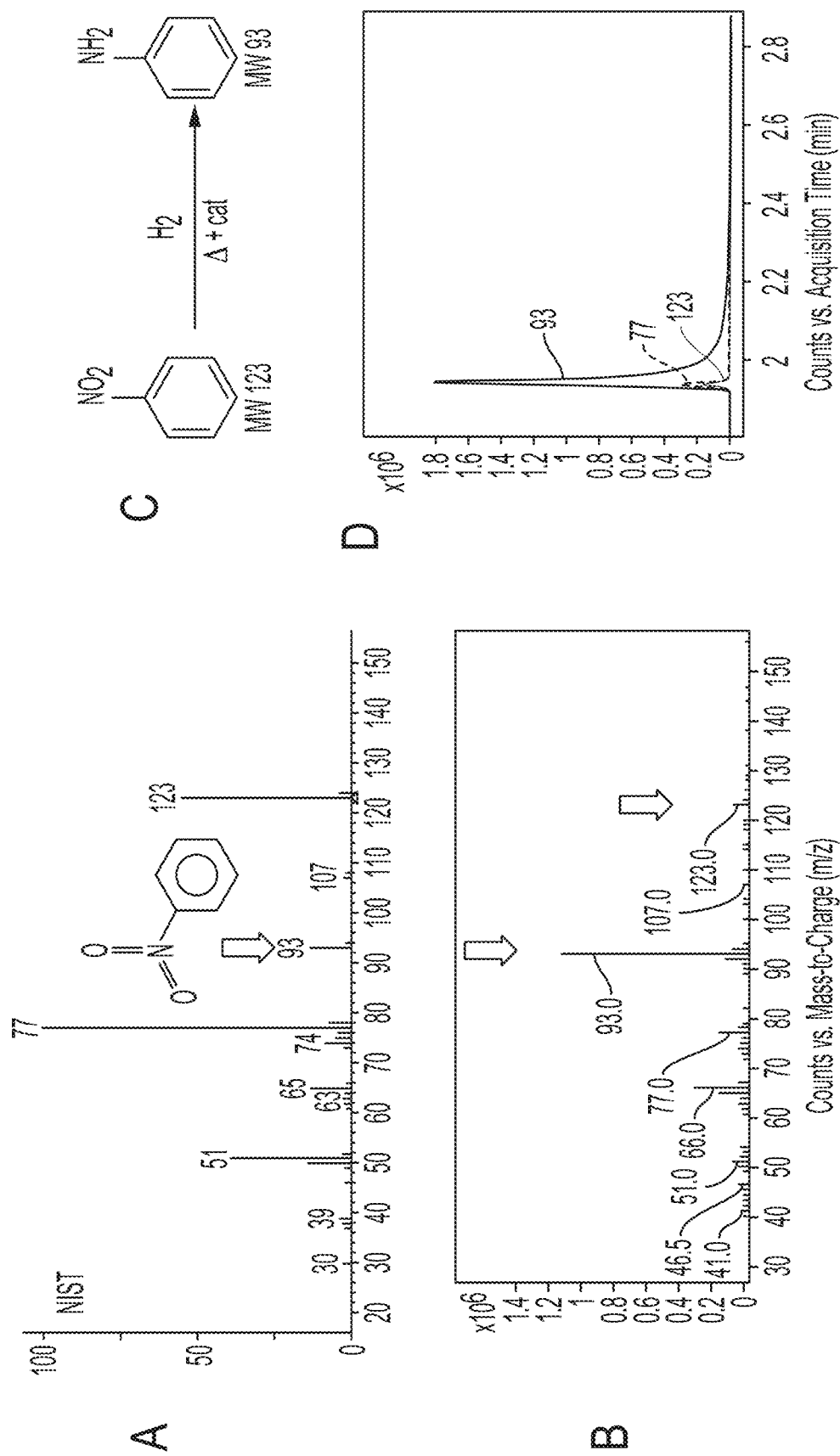
FIGS. 5A-5D illustrate the problems associated with hydrogenation of nitrobenzene in a hydrogen carrier.

FIGS. 5A-5D illustrate the problem with hydrogenation of nitrobenzene in the source with a hydrogen carrier gas. FIG. 5A is the reference library spectrum of nitrobenzene from NIST 17 library. This is how the spectrum appears when helium is used as the carrier gas. The 93 ion abundance should be about 20% of the 123 ion. FIG. 5B is the spectrum obtained with hydrogen carrier gas using a 3 mm drawout lens. The relative abundances in the spectrum are severely distorted and searching it against NIST spectral library would give an incorrect identification as aniline, which is a product of the hydrogenation of nitrobenzene. FIG. 5C shows the reaction of nitrobenzene with hydrogen to form aniline. FIG. 5D shows the extracted ion chromatograms (EICs) for ions 77, 93, and 123. Normally, the EICs would be expected to have the same peak shapes. However, as seen in FIG. 5D, the 93 EIC has a severe tail, while the others do not.

Example 2: Spectral Fidelity of Nitrobenzene Using Silicon Coated Components

Figure 6:
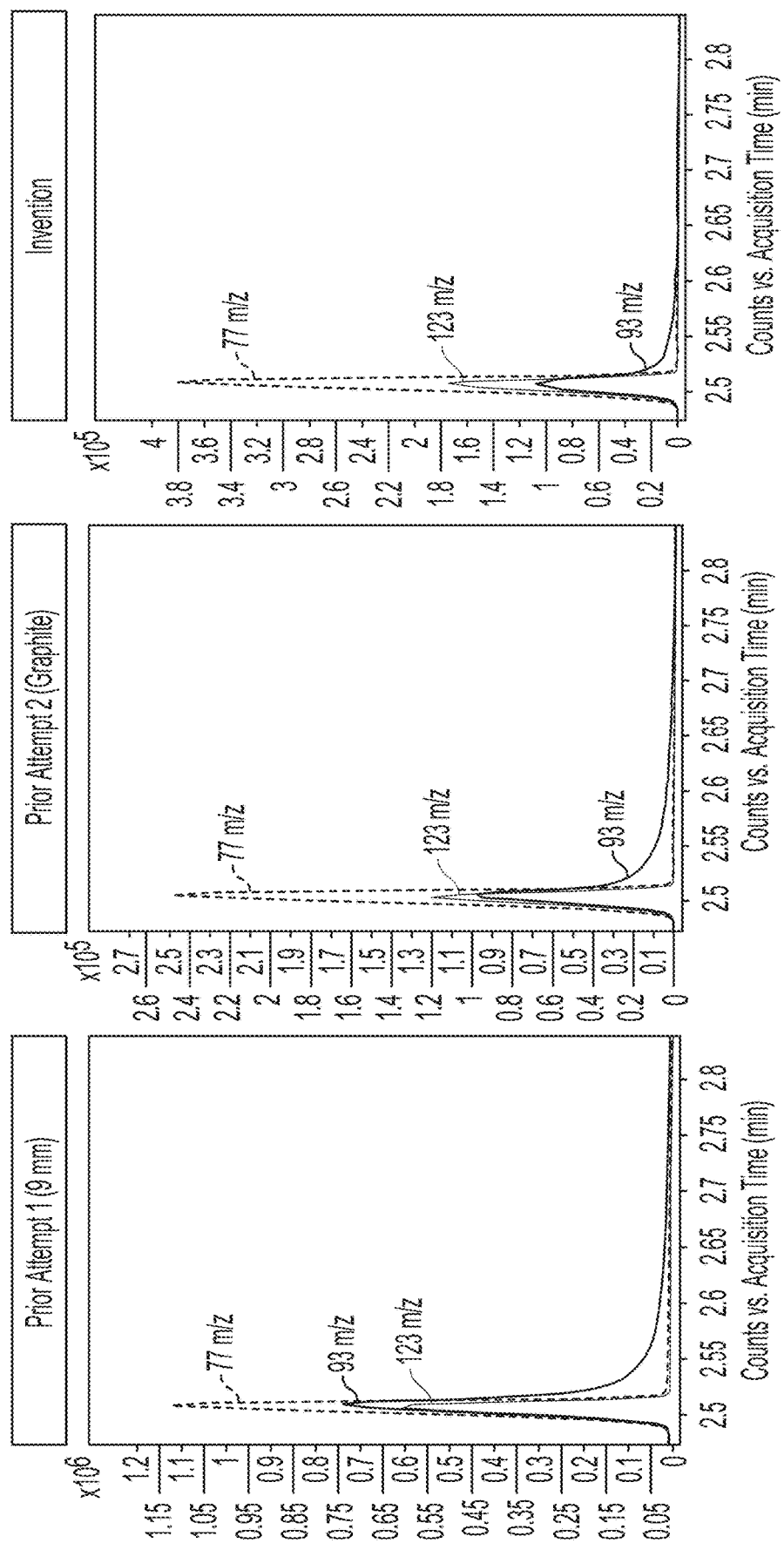
FIG. 6 compares the EICs for the nitrobenzene peak, according to some examples.

FIG. 6 compares the EICs for the nitrobenzene peak with a configuration with a 9 mm drawout lens (Prior Attempt 1) and a configuration using graphite parts/layers (Prior Attempt 2) and a configuration with silicon-coated components (designated "Invention"). Ideally, the 93 abundance would be approximately 20% of the 123. In some examples, the configuration having the silicon-coated components generated the spectrum closest to the reference. The spectrum was correctly identified as nitrobenzene. Tests evaluating other nitro containing compounds, musk ketone, a common fragrance compound, and fenitrothion, a pesticide, yielded similar results. In all of these tests, the configuration with silicon-coated components gave the most accurate results.

Example 3: Chromatographic Tailing of High Boiling Compounds in the Source

One important test when evaluating GC/MS sources is to measure the peak tailing of analytes. Asymmetry in peaks can result from numerous causes such as adsorption on active sites in the source, decomposition, or places in the source with lower temperatures. A useful test is to analyze a homologous series of normal alkanes from n-$C_{10}$ to n-$C_{40}$.

The lower alkanes should have no problems with the temperature of components in the source, as their boiling points are much lower than the source temperature, which is typically 350° C. (the maximum temperature) during the test. Alkanes are very stable and generally exhibit minimal if any tailing due to activity. Therefore, no tailing is expected for the lower alkanes. As the series of alkanes elute from the column into the source, the higher boiling homologues may exhibit increasingly larger tails if there is a problem in the source.

Figures 7A, 7B:
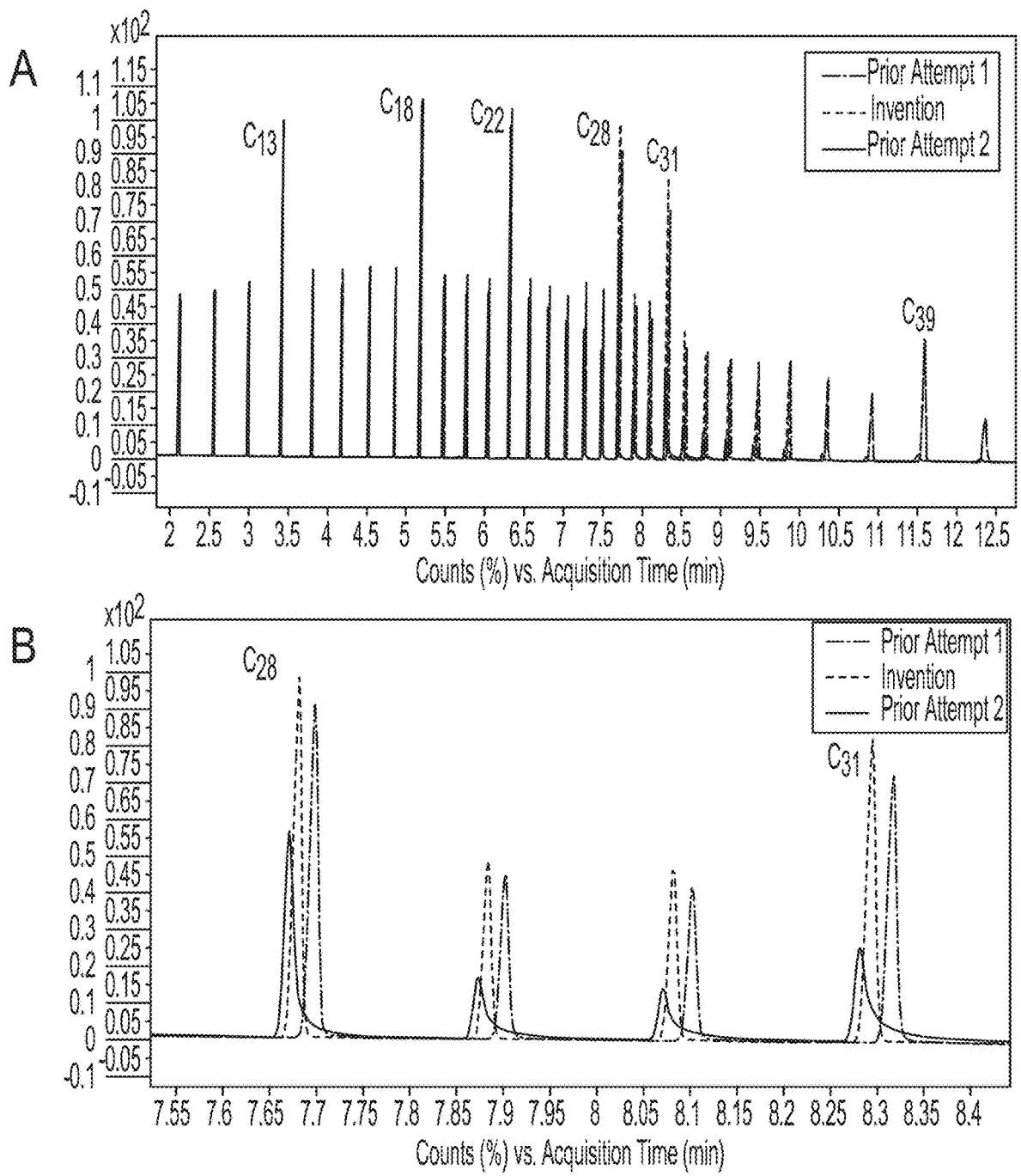
FIGS. 7A-7B show chromatograms of n-alkane sample runs.

FIG. 7A shows the chromatograms of the n-$C_{10}$ to n-$C_{40}$ test sample run with Prior Attempts 1 and 2 compared to a configuration with silicon-coated components ("Invention"). The signals are the response at mass 57 and are normalized the height of the n-$C_{13}$ peak to aid in comparison. Note that in FIG. 7A, the alkanes with Prior Attempt 2 (graphite), exhibit increasing tailing starting at about n-$C_{26}$. The chromatograms in FIG. 7B show an expanded view of n-$C_{28}$ to n-$C_{31}$ alkanes. Prior Attempt 1 and the Invention have peak shapes with the desired symmetry while Prior Attempt 2 has very poor peak shapes. The tailing for Prior Attempt 2 is so bad that the signal height drops to a small fraction of that with the Prior Attempt 1 and the Invention for the latest eluting alkanes. Prior Attempt 1 and the Invention both provide acceptable performance with the alkane test while Prior Attempt 2 does not. The tailing of higher boiling compounds with Prior Attempt 2 is also observed with other classes of compounds as well. For example, tailing can be observed with pharmaceutical agents, polyaromatic hydrocarbons (PAHs), and pesticides.

Figure 8:
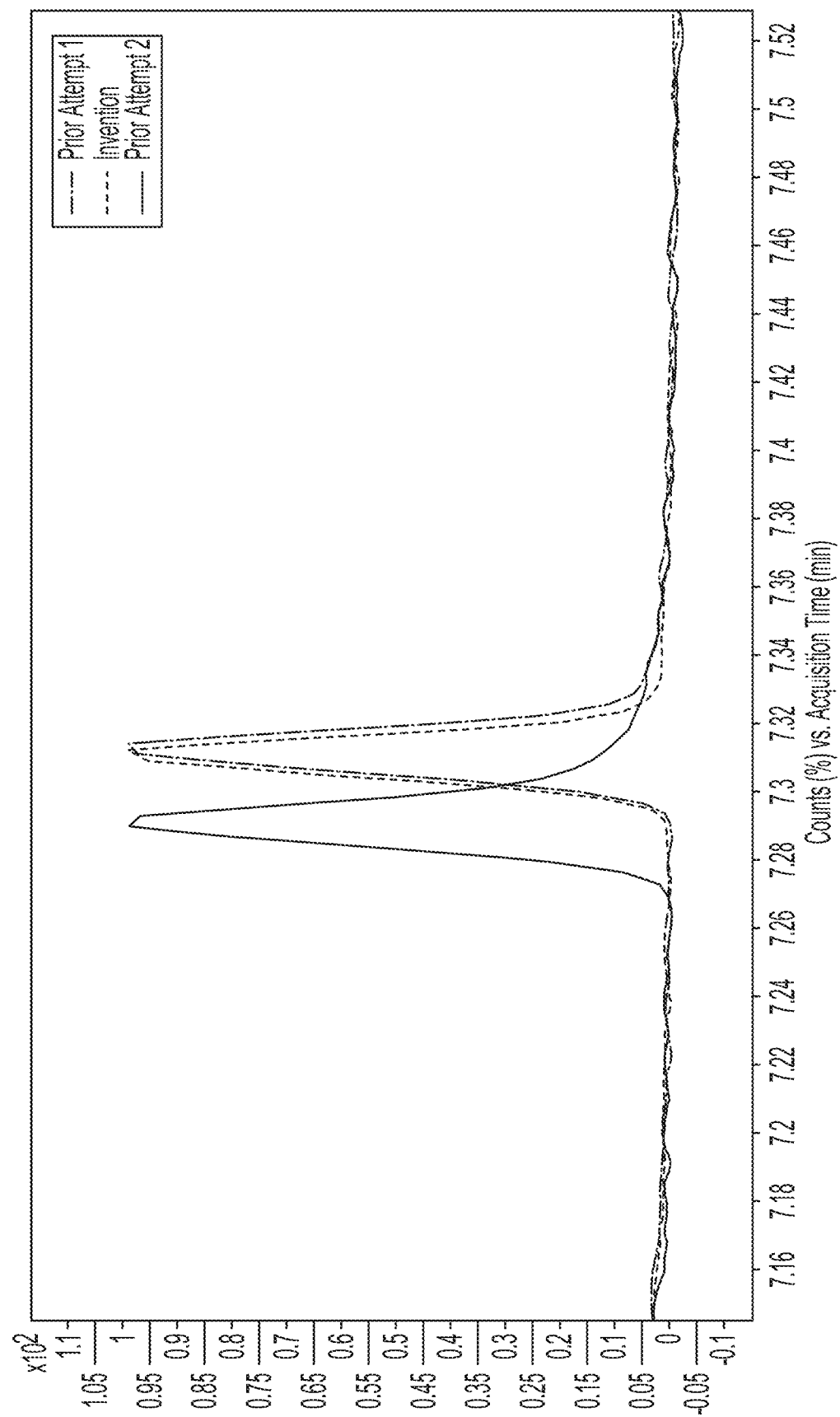
FIG. 8 shows total ion chromatograms of the pesticide etofenprox obtained with Prior Attempts 1 and 2, as well as the inventive ion source, according to some examples.

FIG. 8 shows the problem with the pesticide etofenprox. This compound elutes in the same retention time range as n-$C_{28}$. As with the alkanes, Prior Attempt 2 exhibits substantially more tailing than Prior Attempt 1 and the Invention.

Example 4: Spectral Fidelity of PAH

Figure 9:
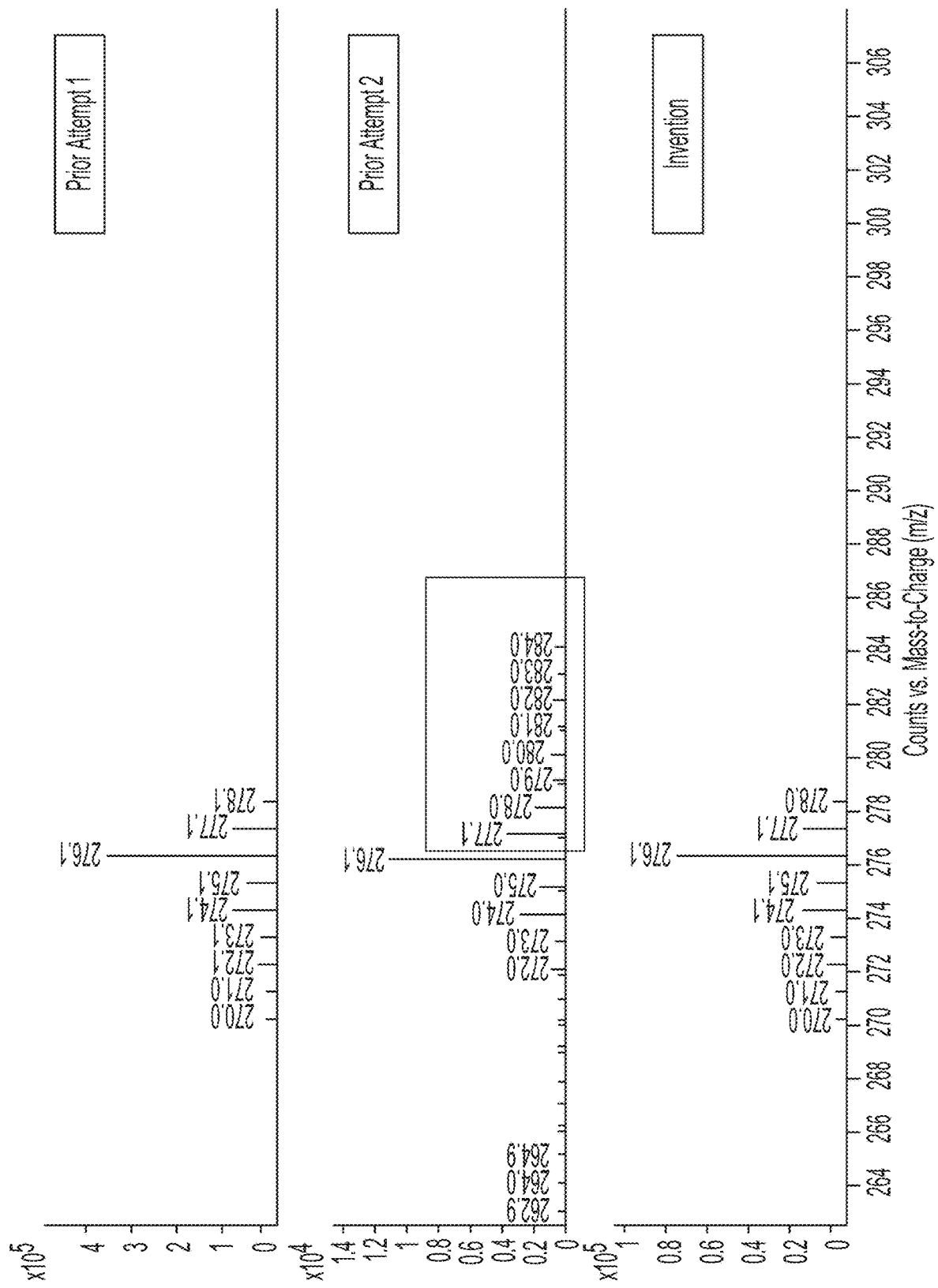
FIG. 9 shows spectra obtained for benzo[ghi] perylene with Prior Attempts 1 and 2, as well as the inventive ion source, according to some examples.

Prior Attempt 2 (graphite) exhibits another problem related to the spectral fidelity of the higher boiling PAHs. Unlike the other two solutions, it produces incorrect higher mass ions in the spectra, especially near the molecular ion. FIG. 9 shows the spectra obtained for benzo[ghi] perylene with Prior Attempts 1 and 2 and the Invention. The box in the Prior Attempt 2 spectrum shows the extraneous ions. These ions reduce the library match values when the spectra are searched against a reference library. For unknowns analysis by spectral interpretation, these extraneous ions can greatly confuse the process. This same problem is seen with other PAHs such as benzo[b]fluoranthene and the internal standard perylene-D12.

Example 5: Linearity of Calibration Curves for Semivolatiles

Some regulated GC/MS methods like Environmental Protection Agency (EPA) Method 8270 for semivolatile pollutants place requirements on the degree of linearity that must be achieved with the initial calibration. Labs strive to achieve a relative standard deviation (RSD) of the response factors over the calibration range to be less than 20%. While this can be challenging even with a helium carrier gas, it is more so with hydrogen. The following examples illustrate calibration results from fast 8270 calibrations performed on the same instrument using Prior Attempts 1 and 2 and the Invention. Table 1 shows the percent RSD of calibration results for several compounds. As seen in Table 1, the calibration performance with the Invention is comparable to or better than the other solutions for most compounds.

TABLE 1

Percent RSD of calibration response factors for several EPA Method 8270 compounds.

| Compound | Calibration Range (ppm) | % RSD of Response Factors | | |
|---|---|---|---|---|
| | | Prior Attempt 1 | Prior Attempt 2 | Invention |
| NDMA | 0.02-100 | 27.7 | 27.3 | 10.8 |
| 4-Chloroaniline | 0.02-100 | 17.3 | 26.5 | 14.2 |
| Pyridine | 0.4-100 | 19.6 | 28.9 | 30.4 |
| Phenol | 0.1-100 | 17.9 | 16.2 | 15.2 |
| Aniline | 0.1-100 | 19.8 | 13.2 | 19.4 |
| Nitrobenzene | 0.1-100 | 25.9 | 14.8 | 18.4 |
| Bis(2-chloroethyl)ether | 0.02-100 | 11.8 | 18.5 | 5.3 |
| 2-Chlorophenol | 0.02-100 | 18.0 | 28.6 | 15.8 |
| 1,3-Dichlorobenzene | 0.02-100 | 3.5 | 16.0 | 3.1 |
| 1,4-Dichlorobenzene | 0.02-100 | 4.0 | 16.5 | 6.6 |
| Benzyl alcohol | 0.05-100 | 27.3 | 26.6 | 14.5 |
| 1,2-Dichlorobenzene | 0.02-100 | 4.4 | 17.5 | 3.5 |
| 2-Methylphenol (o-cresol) | 0.1-100 | 22.1 | 20.0 | 25.9 |
| 4-Methylphenol (p-cresol) | 0.1-100 | 23.2 | 14.5 | 24.8 |
| N-Nitrosodi-n-propylamine | 0.1-100 | 41.8 | 11.1 | 16.8 |
| Hexachloroethane | 0.02-100 | 9.1 | 18.4 | 4.2 |
| Isophorone | 0.02-100 | 37.8 | 16.8 | 6.8 |
| 2-Nitrophenol | 0.1-100 | 26.0 | 20.4 | 18.9 |
| 3-Nitroaniline | 0.1-100 | 41.0 | 23.9 | 36.2 |
| 1,2,4-Trichlorobenzene | 0.02-100 | 2.2 | 14.3 | 3.3 |
| 4-Brompphenyl phenyl ether | 0.02-100 | 19.4 | 15.8 | 5.7 |
| Hexachlorobenzene | 0.02-100 | 9.0 | 15.1 | 3.8 |
| Benzyl butyl phthalate | 0.1-100 | 5.5 | 11.1 | 18.2 |
| Di-n-octyl phthalate | 0.02-100 | 19.7 | 26.8 | 23.8 |
| Naphthalene | 0.02-100 | 3.0 | 20.8 | 5.7 |
| Fluorene | 0.02-100 | 6.7 | 20.6 | 4.8 |
| Pyrene | 0.02-100 | 3.7 | 17.2 | 5.0 |
| Benzo[a]pyrene | 0.02-100 | 18.6 | 22.9 | 12.6 |

The terms and expressions employed herein are used as terms of description and not of limitation, and there is no intention in the use of such terms and expressions of excluding any equivalents of the features shown and described or portions thereof, but it is recognized that various modifications are possible within the scope of the examples of the present application. Thus, it should be understood that although the present application describes specific examples and optional features, modification and variation of the compositions, methods, and concepts herein disclosed may be resorted to by those of ordinary skill in the art, and that such modifications and variations are considered to be within the scope of examples of the present application.

What is claimed is:

1. A method of analyzing a sample with a mass spectrometer, the method comprising:
   flowing the sample in a carrier gas comprising hydrogen through a sample entrance of the mass spectrometer;
   ionizing the sample using an ion source of the mass spectrometer, the ion source comprising:
   a plurality of components defining a flow path therethrough, an inner surface of at least one of the plurality of components having a coating of a layer of silicon, silicon hydride, or a combination thereof, the coating having a thickness between about 400 Angstroms to 1000 Angstroms; and
   analyzing the ions based on ion mass.

2. The method of claim 1, wherein the carrier gas further comprises an inert gas in a ratio of hydrogen to inert gas of 99:1 to 1:99.

3. The method of claim 1, further comprising flowing a conditioning gas into the mass spectrometer, wherein the conditioning gas is different from the carrier gas.

4. The method of claim 1, wherein the ionizing is by electron ionization or chemical ionization.

5. The method of claim 1, further comprising providing a gas chromatograph configured to operate with the mass spectrometer.

6. The method of claim 5, wherein the ion source is contained in the gas chromatograph.

7. The method of claim 1, wherein the plurality of components of the ion source comprises at least one of an ionization chamber, a drawout cylinder, a drawout plate, an entrance lens, an ion focus lens, a repeller, or a repeller insert.

8. The method of claim 1, wherein the method reduces reactivity between the sample and the carrier gas, reduces or eliminates tailing in ion chromatograms, or improves mass spectral fidelity.

9. A method of facilitating analysis of a sample with a mass spectrometer, comprising:
   providing an ion source connectable to a mass spectrometer, the ion source comprising a plurality of components defining a flow path therethrough, an inner surface of at least one of the plurality of components having a coating of a layer of silicon, silicon hydride, or a combination thereof, the coating having a thickness between about 400 Angstroms to 1000 Angstroms; and
   providing instructions to connect the ion source to the mass spectrometer.

10. The method of claim 9, further comprising providing instructions to flow a sample into the ion source using a carrier gas.

11. The method of claim 10, wherein the carrier gas comprises hydrogen.

12. An ion source, comprising:
   a sample entrance; and
   a plurality of components defining a flow path therethrough, an inner surface of at least one of the plurality of components having a coating of a layer of silicon, silicon hydride, or a combination thereof, the coating having a thickness of from about 400 Angstroms to about 1000 Angstroms.

13. The ion source of claim 12, wherein the surface is conformally coated with silicon.

14. The ion source of claim 12, wherein the plurality of components comprises at least one of an ionization chamber, a drawout cylinder, a drawout plate, an entrance lens, an ion focus lens, a repeller, or a repeller insert.

15. The ion source of claim 14, wherein the surface is conformally coated with silicon.

16. The ion source of claim 12, wherein the ion source is an electron ionization (EI) ion source or a chemical ionization (CI) ion source.

17. The ion source of claim 16, wherein the ion source is one of an electron ionization high-efficiency source, an electron ionization inert extractor source, or an electron ionization stainless steel source.

* * * * *